United States Patent
Arnarson et al.

(10) Patent No.: US 6,825,446 B1
(45) Date of Patent: Nov. 30, 2004

(54) THERMAL PROCESSING CHAMBER AND A METHOD OF THERMALLY PROCESSING PRODUCTS

(75) Inventors: Ingolfur Arnarson, Soleyjargata (IS); Gardar Norddahl, Akranes (IS)

(73) Assignee: Skaginn hf., Akranes (IS)

( * ) Notice: Subject to any disclaimer, the term of this patent is extended or adjusted under 35 U.S.C. 154(b) by 0 days.

(21) Appl. No.: 10/069,483

(22) PCT Filed: Aug. 29, 2000

(86) PCT No.: PCT/IS00/00007
§ 371 (c)(1),
(2), (4) Date: Jul. 8, 2002

(87) PCT Pub. No.: WO01/16537
PCT Pub. Date: Mar. 8, 2001

(30) Foreign Application Priority Data

Aug. 31, 1999 (IS) .................................................. 5170

(51) Int. Cl.⁷ .................... B65G 15/30; B65G 17/14; A21B 1/48; F27B 9/06
(52) U.S. Cl. .................... 219/388; 219/400; 198/802
(58) Field of Search .................... 219/388, 392, 219/400; 198/631.1, 802, 844.1, 850, 804, 867.15, 803.11; 99/386, 443 C

(56) References Cited

U.S. PATENT DOCUMENTS

| | | | | |
|---|---|---|---|---|
| 1,117,311 A | * | 11/1914 | Blair | 198/803.13 |
| 3,314,528 A | * | 4/1967 | Mendoza | 198/850 |
| 4,965,435 A | * | 10/1990 | Smith et al. | 219/388 |
| 5,816,138 A | * | 10/1998 | Benson et al. | 99/386 |
| 5,942,142 A | * | 8/1999 | Forney et al. | 219/388 |
| 6,049,066 A | * | 4/2000 | Wilson | 219/400 |
| 6,157,002 A | * | 12/2000 | Schjerven et al. | 219/388 |
| 6,550,610 B2 | * | 4/2003 | Rettore | 198/850 |
| 6,707,014 B1 | * | 3/2004 | Corey et al. | 99/443 C |

FOREIGN PATENT DOCUMENTS

JP          64053912 A     *     3/1989

* cited by examiner

*Primary Examiner*—Joseph Pelham
(74) *Attorney, Agent, or Firm*—Finnegan, Henderson, Farabow, Garrett & Dunner, LLP

(57) ABSTRACT

The present invention relates to a chamber and a method for continuous thermal processing of products being conveyed through the chamber. The thermal processing could be quick-freezing of fish or similar food items. The invention relates more specifically to a device and a method for processing the food items by means of thermal convection directly from a conveyor belt combined with thermal convection from an additional thermal source such as from the surrounding air. The combination of thermal induction provides a good performance e.g. for freezing products fast. The invention further relates to a conveyor belt for form stabilising the food items during the thermal process.

22 Claims, 5 Drawing Sheets

THERMAL PROCESSING CHAMBER AND A METHOD OF THERMALLY PROCESSING PRODUCTS

FIELD OF THE INVENTION

The present invention relates to thermal processing of items in a continuous process, especially food products. The invention relates to a chamber and a method for heating or freezing food products by a combination of thermal conduction between a conveyor belt and the product and thermal convection between a cooling or heating medium and the product. The combination provides a better product quality and a higher capacity of the chamber.

DESCRIPTION OF THE PRIOR ART

Devices and methods for continuously freezing or heating food products e.g. for form freezing the food products exist. Known devices typically have conveying means for conveying the food products through either a heating or a freezing process. The conveying means are typically provided as conveyor belts with an open structure allowing either a cooling or a heating medium such as air to pass through the belt. The belts therefore have conveying surfaces which are non-uniform or rough and which typically causes unwanted structures in the food products as they are either heated or frozen while being supported on the surface. Furthermore the non-uniformity gives a poor thermal conduction from the surface of the conveyor belt to the food products and therefore the thermal efficiency of the devices is relatively low.

When sensitive or delicate food products, such as fish fillets are individually frozen, it is neccesary that the products obtain a stiff outer shape before the product is being handled further, otherwise the value of the product may be lowered. It is therefore essential that the form freezing of the products is completed in one process. In order to ensure the form stability the known tunnel freezers or IQF (Individual quick freezer) installations have relatively long form freezing conveyor belts and therefore the known freezers take up relatively much space. The same problem applies for devices for continous heating such as for conveyor ovens.

The known devices typically use conveyer belts wherein a cooling or a heating medium is blown onto the food items either from the side of the belt or from above the belt. Sufficient cooling or heating is achieved by extending the length of the conveyer belts and thereby the size of the chamber. This can be a problem e.g. when the chamber is installed in ships or in other places with limited space.

DESCRIPTION OF THE INVENTION

It is an object of the present invention to provide a method and a device for continuously processing sensitive food products wherein the efficiency of the processing is improved so that the quality of the product can be improved with the use of less space for the device.

One object of the present invention relates to a thermal processing chamber for processing individual product items, said processing chamber comprising:
 a conveyor for conveying the product items in the chamber, said conveyer comprising:
 a conveyor belt forming an endless loop with a processing part and an idling part, the conveyor belt comprising a plurality of thermal conductive elements, each of the elements being adapted to obtain a first orientation in the processing part of the loop and adapted to obtain a second orientation in the idling part of the loop, the first orientation providing a substantially plan and continuous surface for supporting the product items across at least a number of the elements, and
 power driven means for advancing the conveyor belt, wherein the thermal processing of the product items is performed by a thermal conduction from the elements to the product items.

The power driven means could be regular AC/DC motors with a control system adapted for controlling the position and speed of the conveyor belt. The control system could be integrated in an industrial PC, which could also be used for the control of the chamber in general, e.g. for the control of the temperature of the chamber or for the control of the processing of the product items.

The chamber may further have means for providing a thermal media to the chamber. The thermal media could be a gas such as plain air, which is either relatively hot or cold.

The second orientation of the elements could preferably be adapted so that a passage is provided between the elements. This will allow the cold or hot air to flow between the elements and thereby ensure a good distribution of the cold or hot medium in the chamber. At the same time it will allow the medium to cool the elements down or heat them up before they re-enter the processing part of the loop. Preferably the second orientation is adjustable so that the size of the passage can be adjusted, e.g. so that the amount of gas flowing between the elements can be controlled.

The thermal conductive elements could be parallel arranged elongated beams having a wing formed cross sectional shape. By arranging each of the beams pivotally around a longitudinal centre axis of the beams, the first orientation of the beams may provide a flat and continued surface across a number of the beams. The second orientation of the beams may provide an open structure with good conditions for the flow of the medium between the beams.

The thermal processing of the product items is preferably performed as a combination of a first thermal conduction between the elements and the product items and a second thermal convection between the thermal media and the product items.

The elements could be thermally influenced by a thermal convection between the thermal media and the elements or the thermal media could be influenced by a thermal convection from or to the element. As an example the elements could be either cooled down or heated up with cold or hot air flowing in between the elements or the air flowing in between the elements could be either heated or cooled down by the elements. The one or the other situation could be selected based upon which heating or cooling procedure that would be beneficial for a specific case. In a regular cooling process it would make most sense to let the elements be cooled down with cold air produced in a regular cooling element, e.g. comprising a compressor and an evaporator. In a regular heating process on the other hand, it may make more sense to let the air be heated as it passes the elements, which are heated, from internal electric heating elements.

According to one embodiment of the invention the thermal processing is freezing of the product items and accordingly the thermal media is a cooling media, which could be selected from a group comprising:
 plain air,
 $CO_2$ and
 nitrogen.

The elements could also cooled electrically, e.g. by internal thermoelectric elements.

According to another embodiment of the invention the thermal processing is heating and accordingly the thermal media is heated gas such as heated air. The air could be heated in a heat exchanger or the air could be heated by the elements, which again could be heated by internal electric heating elements.

Preferably the elements are made from a material with a good thermal conductivity such as aluminium. It has been found that a conductivity between 30 W/(K*m) and 230 W/(K*m), such as between 209 W/(K*m) and 229 W/(K*m) is preferred in order to obtain an efficient cooling or heating of the product items positioned on the elements. W is the conducted energy, K is degrees Kelvin and m is the length of the material.

The elements could be coated with a material with a low surface friction for the working temperature. As an example the elements could be coated with PTFE (Teflon™) or a similar plastic material. The coating enables the products to fall off the conveyor at the end of the processing part of the loop, and not stick to the surface of the elements after either a freezing of the products or after a heating of the products. The coating could further protect the elements from corroding. Preferably the elements or the beams are made from deep drawn aluminium profiles which after a chemical sintering is coated with Teflon™.

The elements could be adapted to rotate from the first orientation to the second orientation upon movement of the elements in the endless loop from the processing part to the idling part of the loop. The rotation could be caused by gravity in that the elements or beams simply falls from the first orientation around a pivotal hinge into the second orientation. The elements could then be adapted to rotate back from the second orientation to the first orientation upon movement of the element in the endless loop from the idling part to the processing part of the loop. The rotation could again be caused by gravity in that the elements and the beams are rotating as they are raised vertically in a circular movement, e.g. around a support or driving wheel of the conveyor. The rotation of the elements or beams could be stopped in the second orientation wherein the elements or beams are supported, e.g. by the succeeding element or beam in the loop.

The thermal chamber may be provided with a number of additional conveyors. The additional conveyors could be provided with belts having a partly open surface towards the thermal media. As an example the belts can be regular plastic belts with a 20, 30 or even 40 percent open structure allowing the thermal media to path through the belts. Such belts would not support thermal conduction directly between the belt and the product items but would allow the thermal media to flow through the belt and therefore support the convection between the thermal media and the product. The convection between air and the product would not be as effective as conduction directly between a belt and a product fully supported on the surface of the belt. Still the convection is relatively effective in the case where the products are not lying firmly against the surface of the belt anyway and that would typically be the case after the products have been thrown from one belt to another. The plastic belts or similar regular belts can be used e.g. to full freeze the products by convection between the air and the products.

According to a preferred embodiment of the invention the product items are food items such as fish, meat, cake, bread etc. Accordingly the materials selected for the chamber should be adapted for the purpose of hygienic treatment. Typically the extensive use of non-corrosive materials such as stainless steel and plastic would be preferred.

Another aspect the invention relates to a method of thermally processing product items in a thermal processing chamber provided with a thermal media, said method comprising the steps of:

conveying the product items through the chamber on a plurality of thermally conductive elements, thermally processing the product by providing a thermal conduction between the elements and the product items, and simultaneously providing a thermal convection between the thermal media and the product items.

DETAILED DESCRIPTION OF THE INVENTION

A preferred embodiment of the invention adapted for continuously freezing food products, will now be described in details with reference to the drawing in which.

The processing chamber is used for freezing the food products individually. The products may be fish fillets or similar pieces of meat and they are frozen individually so that they keep their shape and don't stick together. By individully freezing the items it is possible to increase the value of the products and to maximise the values added in the production process.

The food products are cooled partially by means of conduction between a form freezing conveyor belt and the food and partly by means of convection between cold air in the cooling chamber and the food. The temperature in the cooling chamber is approximately minus 38 degrees Celsius, which gives a fast and efficient cooling.

By means of a faster cooling of the products, the time period in which the products are exposed to a strong stream of cooling air is shortened. Therefore the frozen products losses less amount of water and therefore the yield and quality of the final products is higher.

Figure 1:
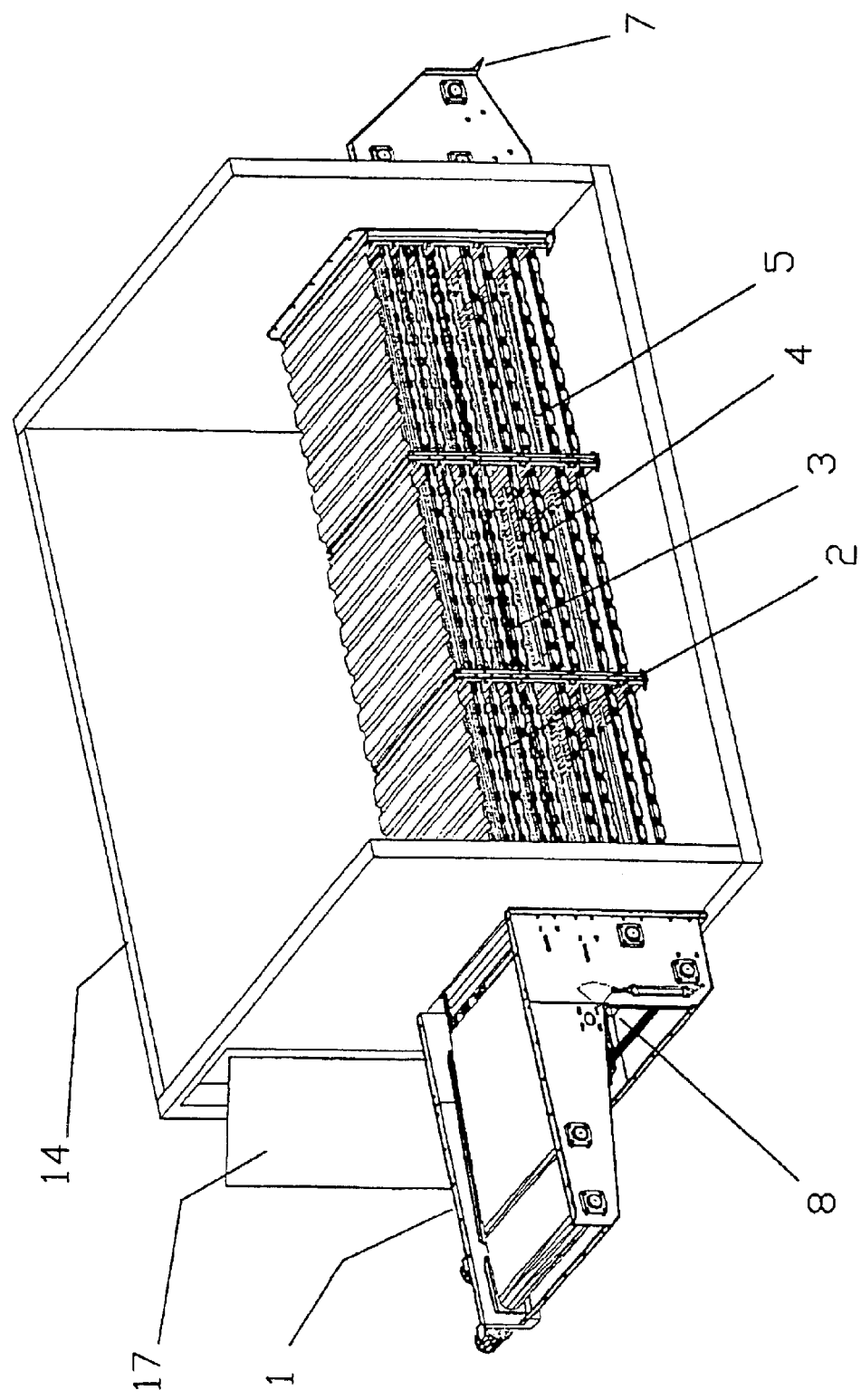
FIG. 1 shows a processing chamber according to the present invention.

Referring to FIG. 1 the processing chamber comprises an in-feed unit 1, an upper form freezing conveyor belt 2, a lower form freezing conveyor belt 3, an upper full freezing conveyor belt 4, a lower full freezing conveyor belt 5, a chute 7 for conveying products out of the chamber, a chute 8 for the transfer of products between the full freezing conveyor belts 4 and 5, a cabinet 14 and a door 17 adapted for the purpose of cleaning and maintenance.

Figure 2:
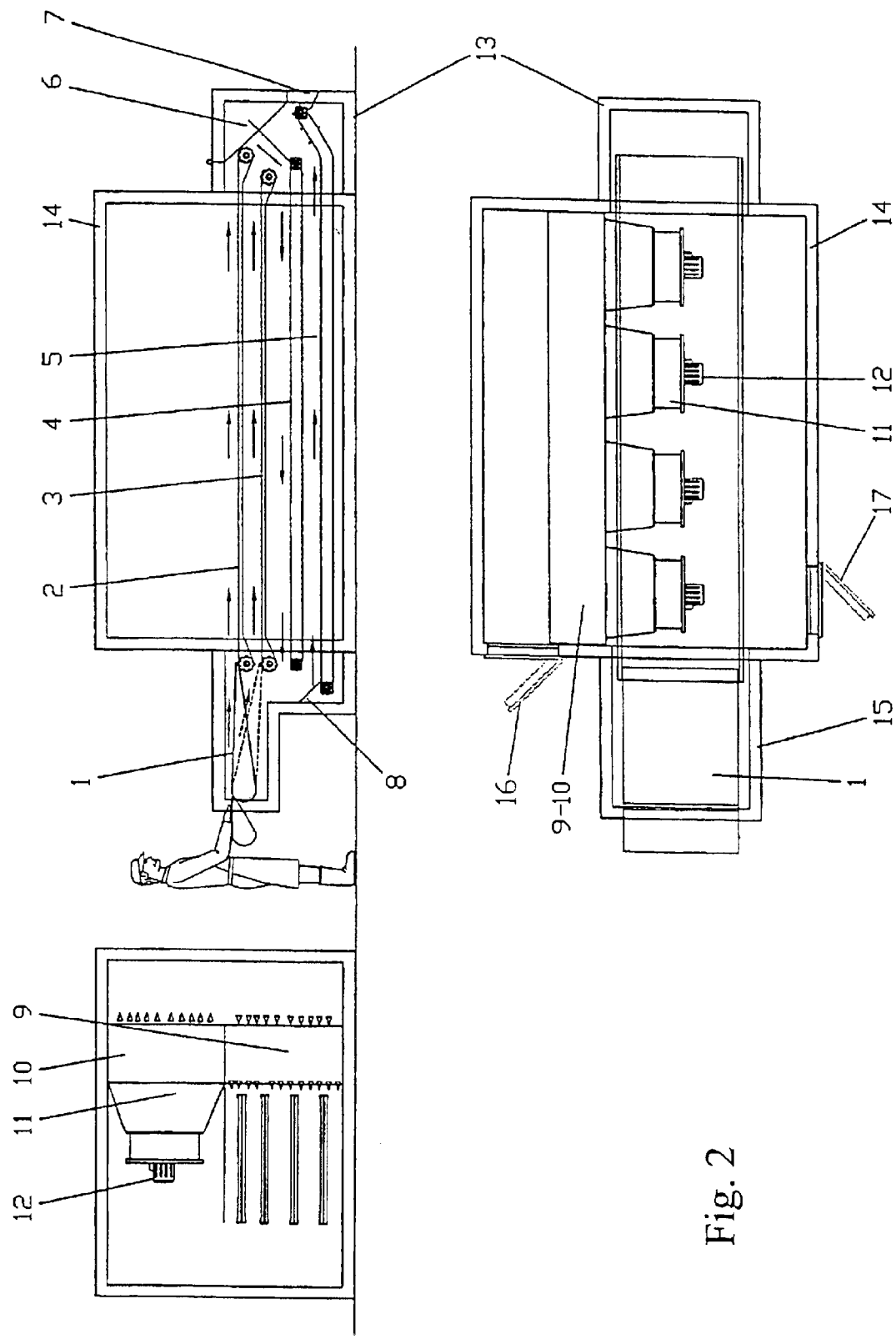
FIG. 2 shows a processing chamber with an in-feed area and a discharge area, seen from the side.

As best seen in FIG. 2 the in-feed unit 1 divides the products into a number of form freezing conveyor belts— FIG. 2 shows two form freezing belts 2,3. The in-feed unit is positioned so that the food items are being moved to the conveyor belt 2 where they are positioned flat against the upper surface of the conveyor belt 2. When the conveyor belt 2 is full, the conveyor belt is stopped and the in-feed unit 1 is moved down so that the food items are not moved to the conveyor belt 3 and the procedure is repeated. While the conveyor belt 3 is being filled, the food on conveyor belt 2 is given time to reach a form stable frozen shell. When conveyor belt 3 is full, the in-feed unit 1 is again moved to the conveyor belt 2, which again starts to convey new food item from the in-feed unit and into the chamber, while the now form stable, partly frozen items are thrown into a chute 6 and collected by the full freezing conveyor belt 4.

The chute 8 is adapted to receive or food products from the conveyor belt 4 and for intermediately storing the products before they are moved to the conveyor belt 5. The chute 8 could also be adapted for moving food products to a glazing unit before they reenter the chamber onto conveyor belt 5.

The full frozen food products leave the chamber through the chute 7 for further processing or packing.

The evaporator is divided into a lower and an upper part 9, 10. The evaporator cools the chamber, e.g. by evaporation of CFC gases or by ammonia compressed by a compressor.

The ventilator 11 with the electric motor 12 is adapted for bringing cold air from the evaporator to the conveyor belts. The isolator 13 isolates the chamber from the ambience by counteracting airflow in and out of the chamber. The inlet to the chamber is also provided with an isolator 15.

The doors 16 and 17 are as mentioned before provided for inspection and maintenance of the chamber.

Figure 3:
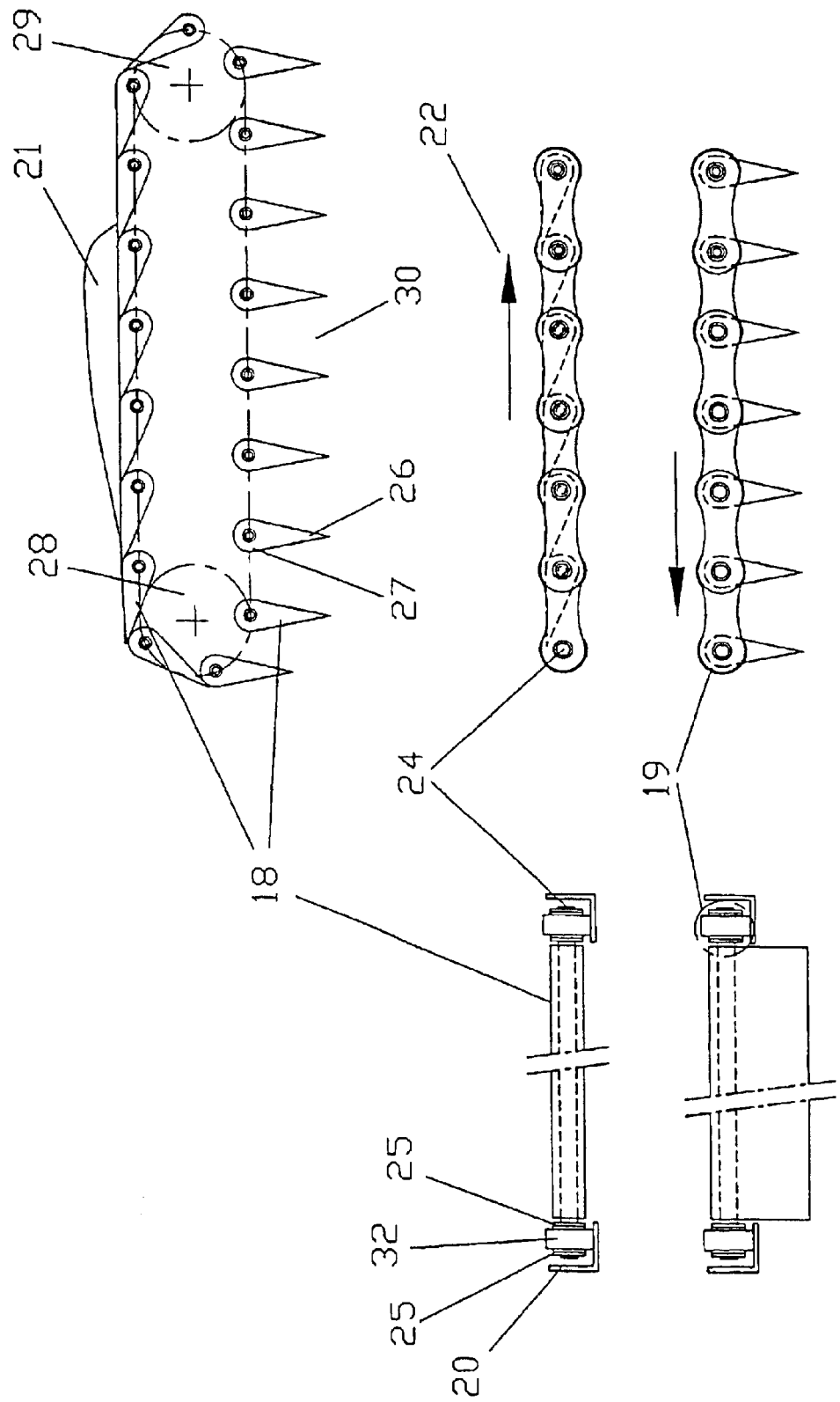
FIG. 3 shows a detailed view of a conveyor belt for a form freezing conveyor.

Referring to FIG. 3 the form freezing conveyor belts are made from a plurality of elongated beams 18 connected in an endless belt by means of stainless steel chains 19. The steel chains may be of a regular type but according to a preferred embodiment, bolts 24 are inserted into holes in the end of each of the chain links and thus connect the links of the chain. The bolts are screwed into the elongated beams and thus simultaneously connect the individual links of the chain and connect the chain with the beams. Since the bolts are allowed to rotate in the holes the beams are allowed to rotate as well.

The beams 18 are made from aluminum, but it could be made from any material having a good thermal conductivity. The aluminum profiles may preferably be coated with a plastic coating such as a PTFE or Teflon™ coating. The coating enables the form frozen food items easily to drop off the belt instead of sticking to the belt and further protects the aluminum from corroding. The beams are provided with a wing shaped cross sectional shape enabling a turbulence free stream of air to pass through the passage 30 between the downward oriented beams. In addition the smooth shape of the surface increases the quality and thus the value of the form frozen product further.

The wing formed cross sectional shape of the beams provides a top part of the beams, when raised to a horizontal position, which top part forms a platform for form freezing of the products. The products lying on the platform quickly form freezes with a planar surface towards the planar platform, both due to the cooling inducted from the beams below the products and due to the cooling from the cold air from above the products. After the form freezing the stiffness of the products hinders the shape changes in the rest of the process when moving between the conveyors of the chamber. The very high heat conduction capabilities of the aluminum beams ensures that the cooling of the products is extremely fast compared with the cooling of traditional conveyors made of plastic or made of a steel grid where consequently only the thermal convection from cold air contributes to the cooling. In the conveyor according to the present invention, both the surface freezing due to the thermal conductance of the cold aluminum and the cooling from the cold air is used.

The shape of the beams not only increases the air flow around the product but also ensures a homogenous air flow, and controls the airflow in such a way that it hinders hot spots around the product. At the same time the beams are moving and therefore the air flow gets more homogenous.

The frame 20 supports the chain wheel 32. The chain wheel is preferably made from PE plastic and attached between the two chain elements 25, so as to support the chain and thus the beams.

The arrow 22 indicates the direction of the conveyor belt.

The distance between each of the beams or the size of the beams is selected so that the end portion 26 of each of the beams is being supported by the top portion 27 of the succeeding beam when the beams are being lifted around the driving or supporting wheel 28. At the other end of the endless loop at the support or driving wheel 29, the beams fall down into an orientation wherein they are freely hanging vertically downwards.

As seen in FIG. 3 the food products, such as a fish fillet 21 is supported on a plan, continuous upper surface across at least a number of the beams 18.

Figure 4:
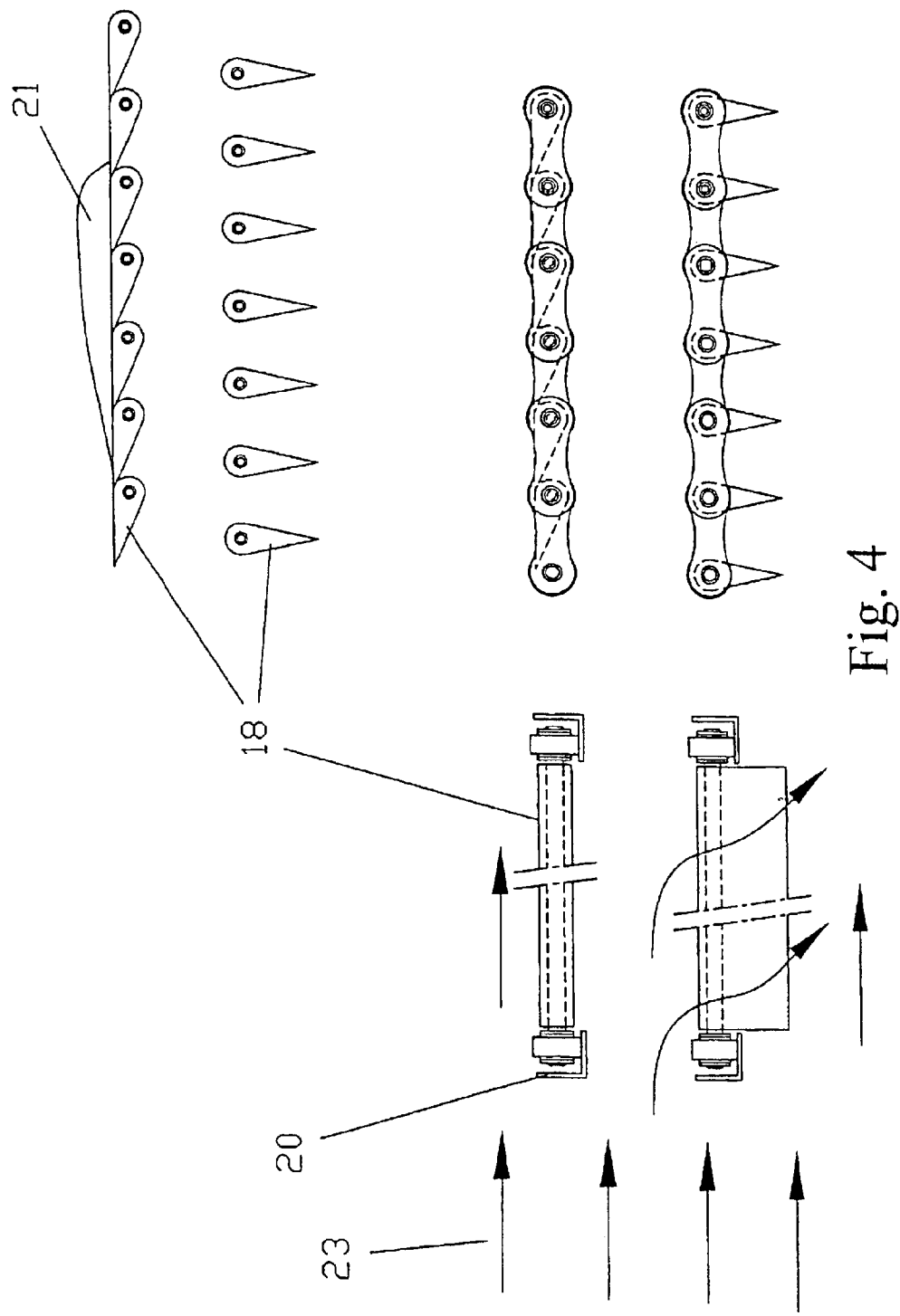
FIG. 4 shows the view of FIG. 3 including indication of a stream of air flowing through the conveyor belt.
Figure 5:
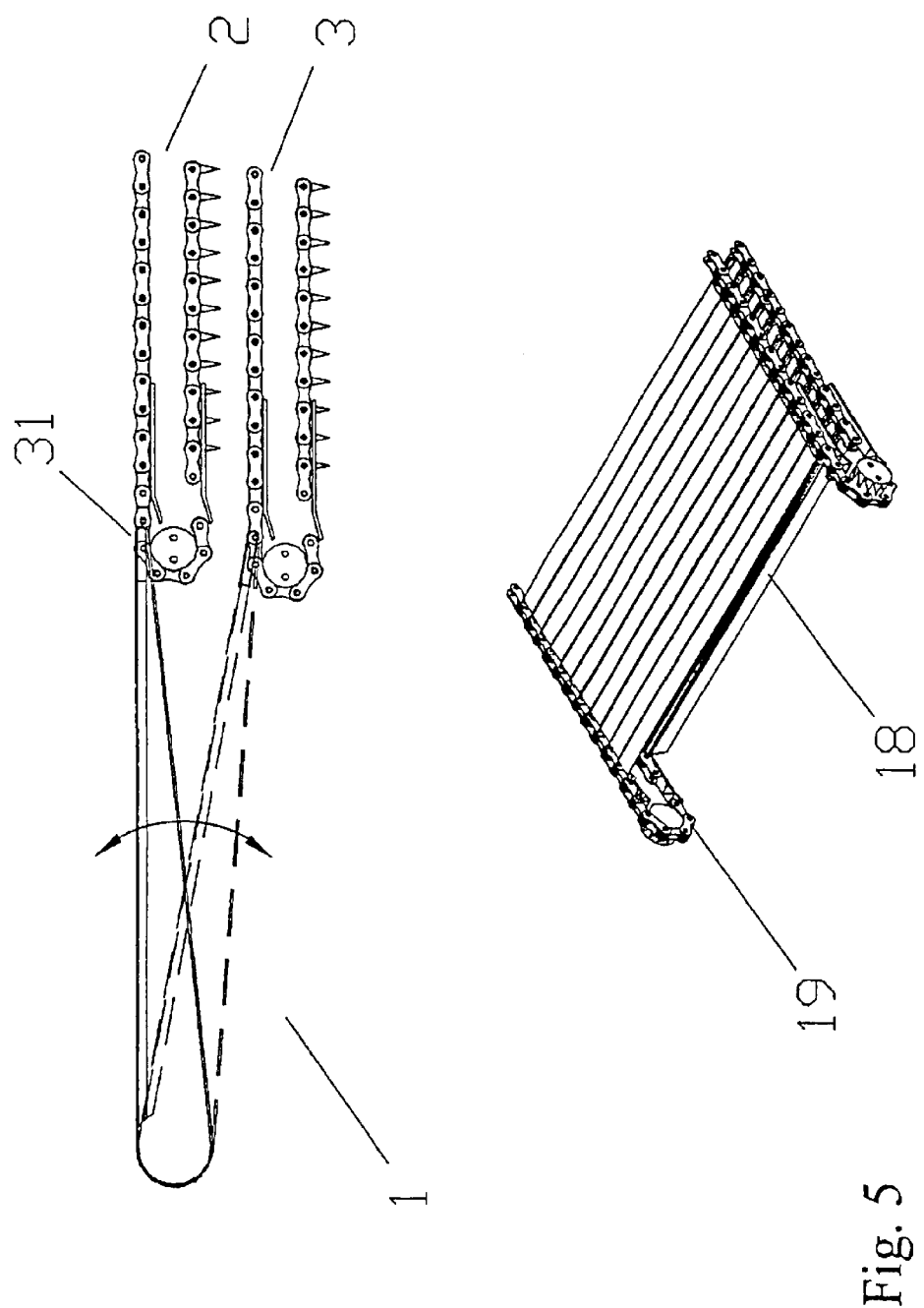
FIG. 5 shows a view of the conveyor belt of FIGS. 3 and 4 with an in-feed unit.

Now referring to FIG. 4 a stream of air 23 can flow from the side of the conveyor belt, partly over the belt and partly below the belt. As indicated, the part of the stream of air flowing below the belt can pass through the passage between the vertically hanging beams and onto the succeeding conveyor belt positioned below It is essential for the freezing capacity as well as for the product quality that the food products are positioned precisely and flat against the surface of the form freezing conveyor belt. Referring to FIG. 5 the in-feed conveyor belt in the in-feed unit 1 should therefore preferably be provided with an end 31, which is adapted to convey the food to a point near the surface of the form freezing conveyor belt. The conveying speed of the form freezing conveyor belt should be at least as fast or even faster than the conveying speed of the in-feed conveyor belt. In that way the food products are pulled off the in-feed conveyor belt and that minimises the risk of the food products being twisted at the transfer between the two conveyors belts.

The full freezing conveyors 3 and 4 are made of PE-plastic with half open conveyor belts and with steel side-chains made of stainless steel on each side. By using steel side-chains and conveyor belts made of plastic, a heating expansion on the plastic conveyor can be reduced. The steel side-chain hinders the expansion of the plastic conveyor and has the same heat expansion coefficient as the frame, at a position where the conveyors are. There it is not a to heat up the chamber e.g. for the defrosting of the evaporators. By defrosting the evaporator the temperature goes from appr. −38° C. up to appr. 30° C. and so there will be significant expansion of the regular plastic conveyors. This construction of the full freezing conveyors enables better glazing abilities than with the known constructions for full freezing, where glazing is performed after the product leaves the freezer. During that procedure it may happen that the temperature of the products is lowered by the glazing so that the product loses its quality. Furthermore the products can freeze together which again lowers the price of the product.

The conveyors are driven by frequency controlled electrical gear motors which work independently. On the end of these gear motors, impulse indicators are connected to sensors so that a control computer can count the pulses and therefrom calculate the location of each beam in the belt conveyor. A connected control computer, e.g in the form of an industrial PC—not shown in the Figs. can therefore at all time track the exact loop position of the conveyors independently and therefrom regulate the system. The control of the chamber may preferably be performed with a software code stored in the memory of the industrial computer.

As seen in FIG. 3 the food products, such as a fish fillet 21 is supported on a planar continuous upper surface across at least a number of the beams 18.

What is claimed is:

1. A thermal processing chamber for processing individual product items, said processing chamber comprising:
   a conveyor for conveying the product items in the chamber, said conveyer comprising:
   a conveyor belt forming an endless loop with a processing part and an idling part, the conveyor belt comprising a plurality of thermal conductive elements, each of the elements being adapted to obtain a first orientation in the processing part of the loop and adapted to obtain a second orientation in the idling part of the loop, the first orientation providing a substantially planar and continuous surface for supporting the product items across at least a number of the elements and wherein the second orientation of the elements provides a passage between the elements so as to allow the gas to flow between the elements;
   means for providing a thermal media to the chamber; and
   power driven means for advancing the conveyor belt,
   wherein thermal processing of the product items is performed by a thermal conduction between the elements and the product items.

2. A thermal processing chamber according to claim 1, wherein the thermal media is a gas.

3. A thermal processing chamber according to claim 1, wherein the second orientation is adjustable so that the size of the passage is adjustable whereby the amount of gas flowing between the elements can be controlled.

4. A thermal processing chamber according to claim 1, wherein the thermal conductive elements are parallel arranged elongated beams having a wing formed cross sectional shape.

5. A thermal processing chamber according to claim 1, wherein the thermal processing of the product items is performed by a combination of a first thermal conduction between the elements and the product items and a second thermal convection between the thermal media and the product items.

6. A thermal processing chamber according to claim 1, wherein the elements are thermally influenced by a third thermal convection from the thermal media to the elements.

7. A thermal processing chamber according to claim 6, wherein the thermal media is thermally influenced by a fourth thermal convection between the elements and the thermal media.

8. A thermal processing chamber according to claim 1, wherein the thermal processing is freezing of the product items and wherein the thermal media is a cooling media.

9. A thermal processing chamber according to claim 8, wherein the cooling media is selected from a group comprising:
   plain air,
   $CO_2$, and
   nitrogen.

10. A thermal processing chamber according to claim 8, wherein the elements are cooled electrically.

11. A thermal processing chamber according to claim 1, wherein the thermal processing is heating and wherein the thermal media is heated gas.

12. A thermal processing chamber according to claim 11, wherein the elements are heated by electricity.

13. A thermal processing chamber according to claim 1, wherein the elements are made from a thermal conductive material.

14. A thermal processing chamber according to claim 13, wherein the thermal conductivity of the material is between 30 and 230 W/(K*m) such as between 209 W/(K*m) and 229 W/(K*m).

15. A thermal processing chamber according to claim 1, wherein the elements are made from aluminum.

16. A thermal processing chamber according to claim 1, wherein the elements are coated with a material with a low surface friction.

17. A thermal processing chamber according to claim 1, wherein the elements are adapted to rotate from the first orientation to the second orientation upon movement of the elements in the endless loop from the processing part to the idling part of the loop and wherein the elements are adapted to rotate back from the second orientation to the first orientation upon movement of the element in the endless loop from the idling part to the processing part of the loop.

18. A thermal processing chamber according to claim 17, wherein the rotation is driven by gravity.

19. A thermal processing chamber according to claim 1, further comprising an additional conveyor with a conveyor belt forming an endless loop, the conveyor belt having a partly open surface towards the thermal media.

20. A thermal processing chamber according to claim 1, wherein the product items are food items.

21. A method of processing product items in a thermal processing chamber provided with a thermal media, said method comprising the steps of:
   conveying the product items through the chamber on a plurality of thermally conductive elements,
   thermally processing the product by providing a thermal conduction between the elements and the product items; and
   simultaneously providing a thermal convection between the thermal media and the product items,
   wherein said processing chamber comprises:
   a conveyor for conveying the product items in the chamber, said conveyer comprising:
   a conveyor belt forming an endless loop with a processing part and an idling part, the conveyor belt comprising a plurality of thermal conductive elements, each of the elements being adapted to obtain a first orientation in the processing part of the loop and adapted to obtain a second orientation in the idling part of the loop, the first orientation providing a substantially planar and continuous surface for supporting the product items across at least a number of the elements and wherein the second orientation of the elements provides a passage between the elements so as to allow the gas to flow between the elements.

22. A method of processing product items in a thermal processing chamber comprising the steps of:
   conveying the product items through the chamber on a plurality of thermally conductive elements,
   thermally processing the product by providing a thermal conduction between the elements and the product items, and
   simultaneously providing a thermal convection between the thermal media and the product items,
   wherein said processing chamber comprises:
   a conveyor for conveying the product items in the chamber, said conveyer comprising:

a conveyor belt forming an endless loop with a processing part and an idling part, the conveyor belt comprising a plurality of thermal conductive elements, each of the elements being adapted to obtain a first orientation in the processing part of the loop and adapted to obtain a second orientation in the idling part of the loop, the first orientation providing a substantially planar and continuous surface for supporting the product items across at least a number of the elements and wherein the second orientation of the elements provides a passage between the elements so as to allow the gas to flow between the element;

means for providing a thermal media to the chamber; and power driven means for advancing the conveyor belt.

* * * * *

UNITED STATES PATENT AND TRADEMARK OFFICE
CERTIFICATE OF CORRECTION

PATENT NO. : 6,825,446 B1
DATED : November 30, 2004
INVENTOR(S) : Ingolfur Arnason et al.

It is certified that error appears in the above-identified patent and that said Letters Patent is hereby corrected as shown below:

Title page,
Items [12] and [75], change inventor's name from "Arnarson" to -- Arnason --.

Column 10,
Line 4, "element;" should read -- elements; --.

Signed and Sealed this

Twenty-second Day of February, 2005

JON W. DUDAS
*Director of the United States Patent and Trademark Office*